US009418448B2

(12) United States Patent
Hou et al.

(10) Patent No.: US 9,418,448 B2
(45) Date of Patent: Aug. 16, 2016

(54) DEVICES, TERMINALS AND METHODS FOR IMAGE PROCESSING (71) Applicant: Tencent Technology (Shenzhen) Company Limited, Shenzhen (CN)

(72) Inventors: Fang Hou, Shenzhen (CN); Yongjian Wu, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 0 days.

(21) Appl. No.: 14/745,794

(22) Filed: Jun. 22, 2015

(65) Prior Publication Data

US 2015/0294484 A1  Oct. 15, 2015

Related U.S. Application Data (63) Continuation of application No. PCT/CN2014/082291, filed on Jul. 16, 2014.

(30) Foreign Application Priority Data

Jul. 24, 2013 (CN) .......................... 2013 1 0314815

(51) Int. Cl.
*G06K 9/00* (2006.01)
*G06T 7/40* (2006.01)
*G06T 7/00* (2006.01)

(52) U.S. Cl.
CPC ............... *G06T 7/408* (2013.01); *G06T 7/0002* (2013.01); *G06T 2207/10024* (2013.01); *G06T 2207/20068* (2013.01); *G06T 2207/30168* (2013.01)

(58) Field of Classification Search
None
See application file for complete search history.

(56) References Cited

U.S. PATENT DOCUMENTS

2006/0017820 A1* 1/2006 Kim ....................... H04N 5/772 348/231.2
2012/0109858 A1* 5/2012 Makadia ........... G06F 17/30026 706/12

FOREIGN PATENT DOCUMENTS

CN 102917157 2/2013
CN 102917157 A * 2/2013
EP 2450874 5/2012
WO WO 2004/002169 12/2003

OTHER PUBLICATIONS

Patent Cooperation Treaty, International Search Report for PCT/CN2014/082291, mailed Oct. 21, 2014.
Patent Cooperation Treaty, Written Opinion for PCT/CN2014/082291, mailed Oct. 21, 2014.
Patent Cooperation Treaty, International Preliminary Report on Patentability for PCT/CN2014/082291, issued Jan. 26, 2016.

* cited by examiner

*Primary Examiner* — Stephen R Koziol
*Assistant Examiner* — Amandeep Saini
(74) *Attorney, Agent, or Firm* — Jones Day (57) ABSTRACT Devices, terminals and methods are provided for image processing. For example, a raw image is loaded to be viewed, the raw image being selected by a user terminal; a first image to be displayed is obtained by analyzing and encoding the raw image, the first image being of a predetermined image format; one or more preset image display parameters are acquired; a quality score of the first image is obtained by performing quality analysis and calculation for the first image using the preset image display parameters; and the first image and the quality score of the first image are displayed to the user terminal.

15 Claims, 8 Drawing Sheets

$$\begin{bmatrix} -1 & -1 & -1 & -1 & -1 \\ -1 & -1 & -1 & -1 & -1 \\ -1 & -1 & 24 & -1 & -1 \\ -1 & -1 & -1 & -1 & -1 \\ -1 & -1 & -1 & -1 & -1 \end{bmatrix}$$

DEVICES, TERMINALS AND METHODS FOR IMAGE PROCESSING

CROSS-REFERENCES TO RELATED APPLICATIONS

This application is a continuation of International Application No. PCT/CN2014/082291, with an international filing date of Jul. 16, 2014, now pending, which claims priority to Chinese Patent Application No. 201310314815.2, filed Jul. 24, 2013, both applications being incorporated by reference herein for all purposes.

BACKGROUND OF THE INVENTION

Certain embodiments of the present invention are directed to computer technology. More particularly, some embodiments of the invention provide systems and methods for data processing. Merely by way of example, some embodiments of the invention have been applied to image processing. But it would be recognized that the invention has a much broader range of applicability.

With the wide use of imaging devices, such as digital cameras, mobile phones, and camcorder, the amount of images (e.g., photos) that are generated increases significantly, and the need for viewing and beautification of the images also increase.

Presently, in photo viewing, the quality of photo is determined subjectively. Thus, manual viewing and comparison are often needed to select one or more photos, and the process is usually tedious. In addition, subjective evaluation often varies greatly and cannot form a uniform standard. Photos may include a large amount of information, such as chromaticity, saturation level and blur level. But the subjective evaluation cannot accurately determine the quality of the photo.

Hence it is highly desirable to improve the techniques for image processing.

BRIEF SUMMARY OF THE INVENTION

According to one embodiment, a method is provided for image processing. For example, a raw image is loaded to be viewed, the raw image being selected by a user terminal; a first image to be displayed is obtained by analyzing and encoding the raw image, the first image being of a predetermined image format; one or more preset image display parameters are acquired; a quality score of the first image is obtained by performing quality analysis and calculation for the first image using the preset image display parameters; and the first image and the quality score of the first image are displayed to the user terminal.

According to another embodiment, a device for image processing includes: an image coding module configured to load a raw image to be viewed and obtain a first image to be displayed by analyzing and encoding the raw image, the raw image being selected by a user terminal, the first image being of a predetermined image format, a scoring module configured to acquire one or more preset image display parameters and obtain a quality score of the first image by performing quality analysis and calculation for the first image using the preset image display parameters, and a display module configured to display the first image and the quality score of the first image to the user terminal.

According to yet another embodiment, a terminal for image processing includes: a device that contains: an image coding module configured to load a raw image to be viewed and obtain a first image to be displayed by analyzing and encoding the raw image, the raw image being selected by a user terminal, the first image being of a predetermined image format, a scoring module configured to acquire one or more preset image display parameters and obtain a quality score of the first image by performing quality analysis and calculation for the first image using the preset image display parameters, and a display module configured to display the first image and the quality score of the first image to the user terminal.

According to yet another embodiment, a non-transitory computer readable storage medium includes programming instructions for image processing. The programming instructions are configured to cause one or more data processors to execute certain operations. For example, a raw image is loaded to be viewed, the raw image being selected by a user terminal; a first image to be displayed is obtained by analyzing and encoding the raw image, the first image being of a predetermined image format; one or more preset image display parameters are acquired; a quality score of the first image is obtained by performing quality analysis and calculation for the first image using the preset image display parameters; and the first image and the quality score of the first image are displayed to the user terminal.

For example, the systems and methods disclosed herein are configured to perform quality analysis and weighting calculations on an image using preset image display parameters to obtain a quality score, and display the quality score and the image together to a user terminal, so as to quantify image quality and improve accuracy of image quality determination for user convenience, so that a user, upon viewing the image, knows the image quality.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
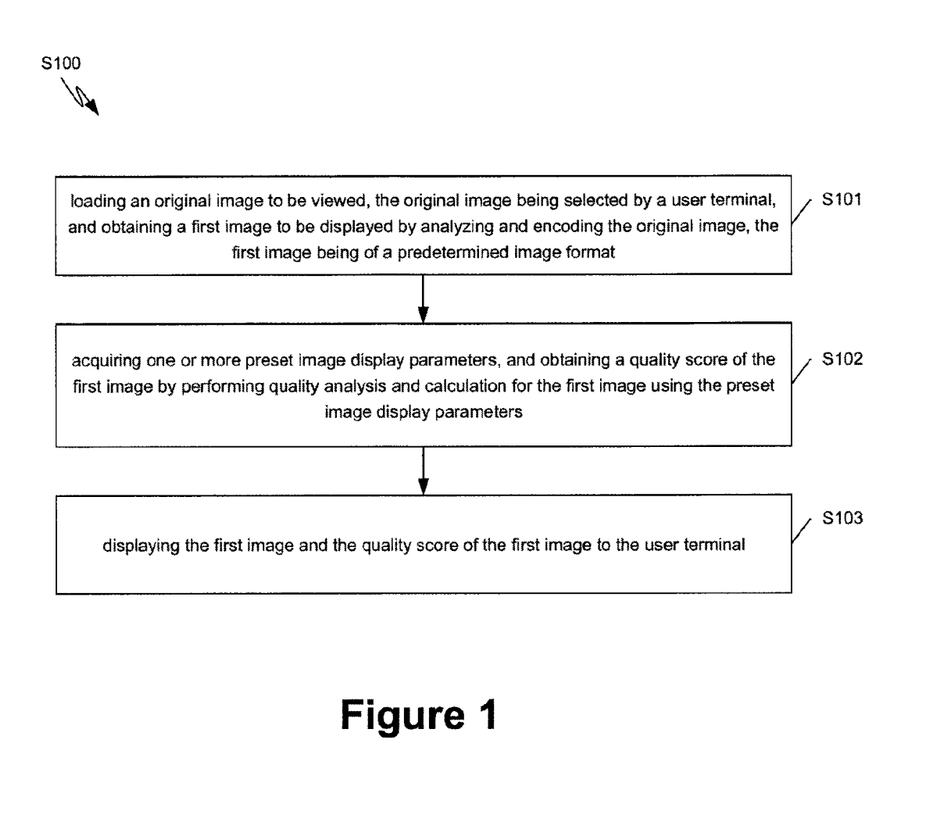
FIG. 1 is a simplified diagram showing a method for image processing according to one embodiment of the present invention.

FIG. 1 is a simplified diagram showing a method for image processing according to one embodiment of the present invention. The diagram is merely an example, which should not unduly limit the scope of the claims. One of ordinary skill in the art would recognize many variations, alternatives, and modifications. The method S100 includes at least processes S101-S103.

According to one embodiment, the process S101 includes: loading a raw image to be viewed, the raw image being selected by a user terminal, and obtaining a first image to be displayed by analyzing and encoding the raw image, the first image being of a predetermined image format. For example, the user terminal includes a mobile phone, a tablet computer, a personal computer, etc. In another example, the user terminal is equipped with an image viewer which can be a type of application software, such as a QQ image viewer or any other suitable image browsers. In yet another example, a user can operate the image viewer on the user terminal as needed to view and browse an image from an electronic device with a camera function, such as a digital camera, a mobile phone or a camcorder, etc.

According to another embodiment, the user terminal is connected with the electronic device with the camera function via a data line to obtain the image in the electronic device, and stores the obtained image locally where the user terminal is positioned. A user may want to view an image via the image viewer on the user terminal, and determine the quality of multiple images from the electronic device such as a digital camera, a mobile phone and a camera, so as to screen or process these images in other manners, according to certain embodiments. For instance, an image with a poor quality may be deleted or trimmed.

According to yet another embodiment, the information of an image, such as chromaticity, saturation level, blur level and, other image display parameters, is analyzed to generate a concrete score so as to provide a uniform standard for image quality determination, so that a user's cognition of image quality is based on data. For example, a raw image selected by the user terminal is loaded via the image viewer. As an example, the image viewer analyzes and encodes the raw image so as to obtain the first image to be displayed. As another example, the first image satisfies one or more display requirements and a predetermined image format (e.g., JPEG, etc.) for further image information processing. The image viewer can analyze and encode the raw image in various manners, according to some embodiments. For example, a code of the raw image is analyzed to obtain a raw image information stream. As an example, the raw image information stream is encoded to generate the first image to be displayed in the predetermined image format (e.g., JPEG, etc.).

In one embodiment, the process S102 includes: acquiring one or more preset image display parameters and obtaining a quality score of the first image by performing quality analysis and calculation for the first image using the preset image display parameters. For example, the the preset image display parameters include edge space distribution, color distribution, image blur level, saturation level, etc. In another example, one or more parameter scores of the first image are generated based on at least information associated with the preset image display parameters.

Figure 2A:
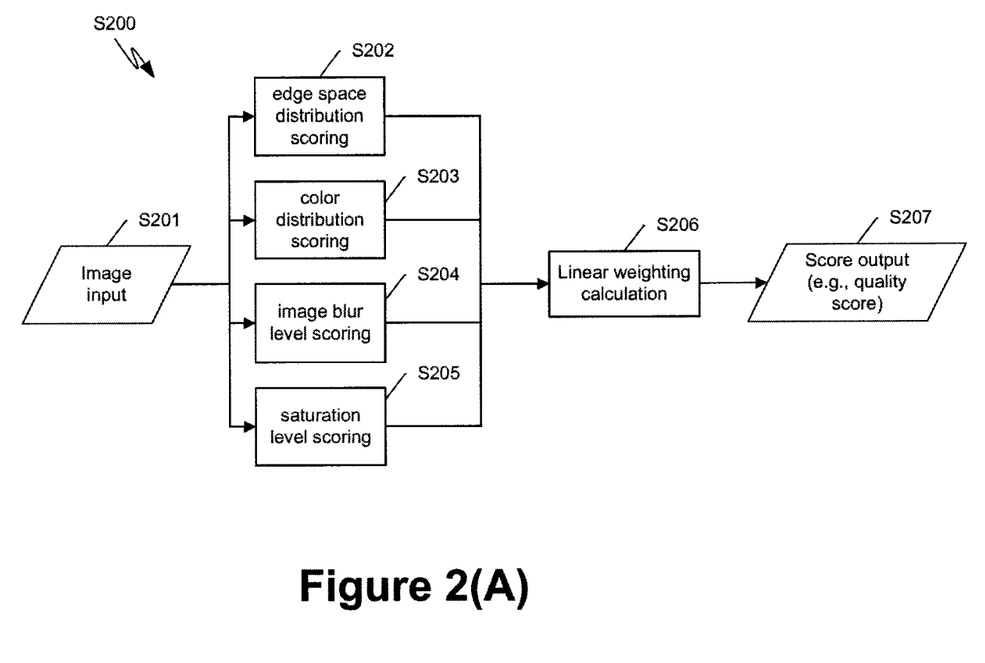
FIG. 2(A) is a simplified diagram showing a method for generating a quality score for an image according to one embodiment of the present invention.

FIG. 2(A) is a simplified diagram showing a method for generating a quality score for an image according to one embodiment of the present invention. The diagram is merely an example, which should not unduly limit the scope of the claims. One of ordinary skill in the art would recognize many variations, alternatives, and modifications. The method S200 includes at least processes S201-S207.

According to one embodiment, one or more parameter scores of the first image are generated based on at least information associated with edge space distribution, color distribution, image blur level, and saturation level of the first image, e.g., as shown in the processes S202-S205. For example, the process S202 includes generating a parameter score for edge space distribution of the first image. In another example, the score for edge space distribution is generated according to a principle that if a main body is simple, then the associated edge space distribution is concentrated. In another example, the more concentrated the edge space distribution is, the higher the score for edge space distribution is.

Figure 2B:
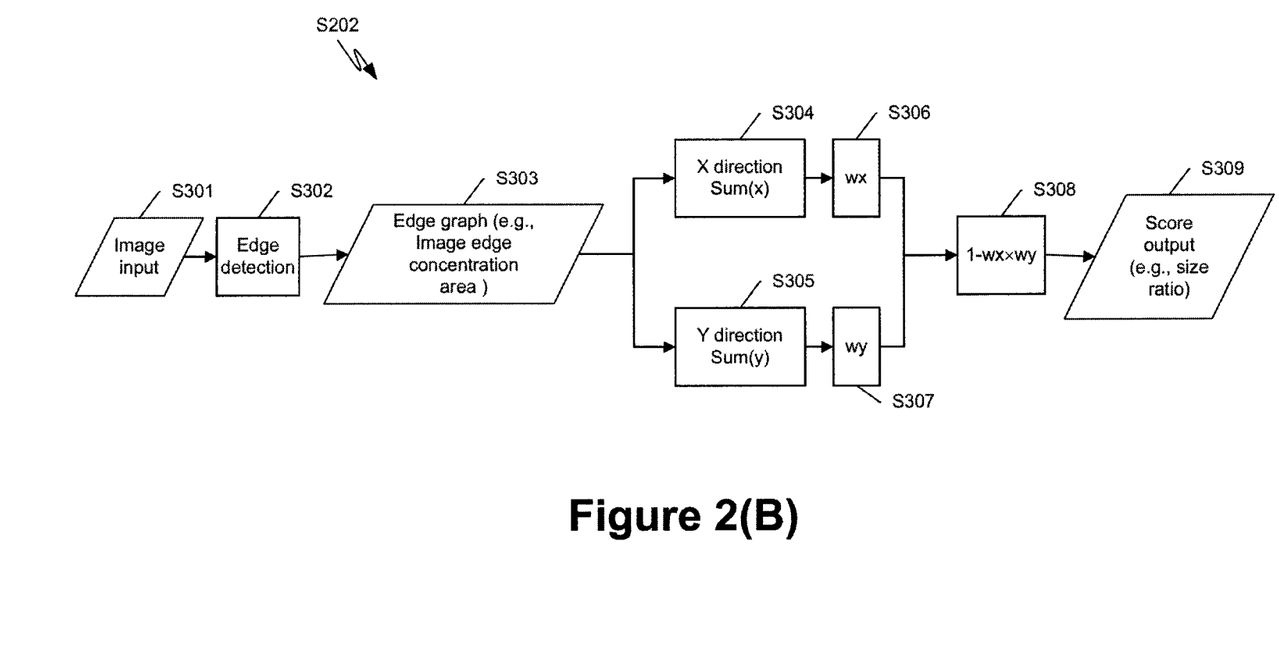
FIG. 2(B) is a simplified diagram showing a process for generating a score for edge space distribution according to one embodiment of the present invention.

FIG. 2(B) is a simplified diagram showing a process for generating a score for edge space distribution according to one embodiment of the present invention. The diagram is merely an example, which should not unduly limit the scope of the claims. One of ordinary skill in the art would recognize many variations, alternatives, and modifications. The process S202 includes at least sub-processes S301-S309.

According to one embodiment, an image edge of the first image to be displayed is detected (e.g., the sub-process S302), and an image-edge-concentration area is obtained (e.g., the sub-process S303). For example, the image-edge-concentration area is obtained using a preset matrix to filter the raw image associated with the first image.

Figure 2C:
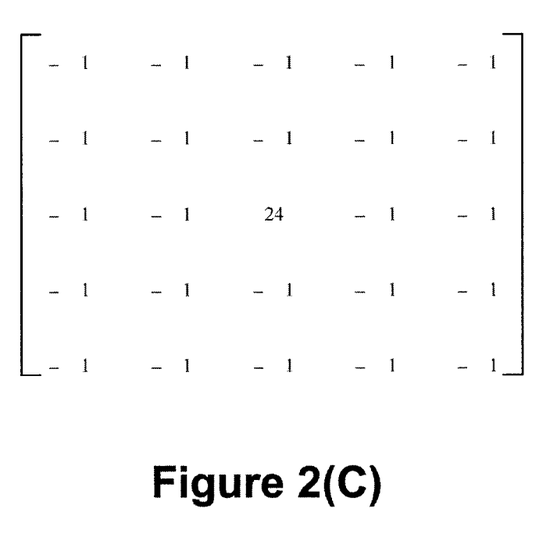
FIG. 2(C) is a simplified diagram showing a preset matrix for filtering a raw image according to one embodiment of the present invention.

FIG. 2(C) is a simplified diagram showing a preset matrix for filtering a raw image according to one embodiment of the present invention. The diagram is merely an example, which should not unduly limit the scope of the claims. One of ordinary skill in the art would recognize many variations, alternatives, and modifications.

Referring back to FIG. 2(B), a size ratio between the image-edge-concentration area and the first image is calculated, and the size ratio corresponds to one of the parameter scores, according to certain embodiments. For example, as shown in FIG. 2(B), a transverse ratio between the image-edge-concentration area and the first image is calculated (e.g., the sub-process S306) and a longitudinal ratio between the image-edge-concentration area and the first image is calculated (e.g., the sub-process S307), where the transverse direction corresponds to a X direction and the longitudinal direction corresponds to a Y direction. In another example, the transverse ratio corresponds to a ratio wx (e.g., 90%) determined along the X direction and the longitudinal ratio corresponds to a ratio wy (e.g., 90%) determined along the Y direction. In yet another example, the size ratio is calculated based at least in part on the transverse ratio and the longitudinal ratio (e.g., the sub-process S308). As an example, the size ratio is determined as 1−wx×wy.

Referring back to FIG. 2(A), the process S203 includes: generating a parameter score for color distribution of the first image, according to some embodiments. For example, a linear histogram of image brightness of the first image is obtained. In another example, the linear histogram is compared with a preset standard histogram. In another example, a color distribution difference between the linear histogram and the preset standard histogram is calculated, and the color distribution difference corresponds to one of the parameter scores.

According to another embodiment, the process S204 includes: generating a parameter score for image blur level of the first image. For example, a two-dimensional discrete Fourier transformation is performed on the first image that includes a plurality of first pixels. In another example, a pixel ratio between one or more second pixels with a frequency higher than a preset threshold and the first pixels is calculated. The second pixels are among the first pixels, and the pixel ratio corresponds to one of the parameter scores, according to certain embodiments.

According to another embodiment, the process S205 includes: generating a parameter score for saturation level of the first image. For example, an average saturation value associated with the first image is calculated in a HSV color space, and the average saturation value corresponds to one of the parameter scores. HSV is a color model including three color parameters, namely hue (H), saturation (S) and value (V).

According to yet another embodiment, the process S206 includes: performing a linear weighting calculation based on at least information associated with the parameter scores to obtain the quality score. For example, the linear weighting calculation is performed as follows:

$$QS = \frac{ESD \times a + CD \times b + IBL \times c + SL \times d}{a+b+c+d} \quad (1)$$

where QS represents the quality score, ESD represents a parameter score for edge space distribution (e.g., a size ratio), CD represents a parameter score for color distribution (e.g., a color distribution difference), IBL represents a parameter score for image blur level (e.g., a pixel ratio), and SL represents a parameter score for saturation level (e.g., an average saturation value). In addition, a, b, c and d are weights which can be defined based on one or more empirical values, in some embodiments. For example, the weights b and c can be slightly larger than the weights a and d.

In one embodiment, the process S103 includes: displaying the first image and the quality score of the first image to the user terminal. For example, after the quality score of the first image is obtained, the quality score and the first image are displayed together to the user terminal.

Figure 2D:
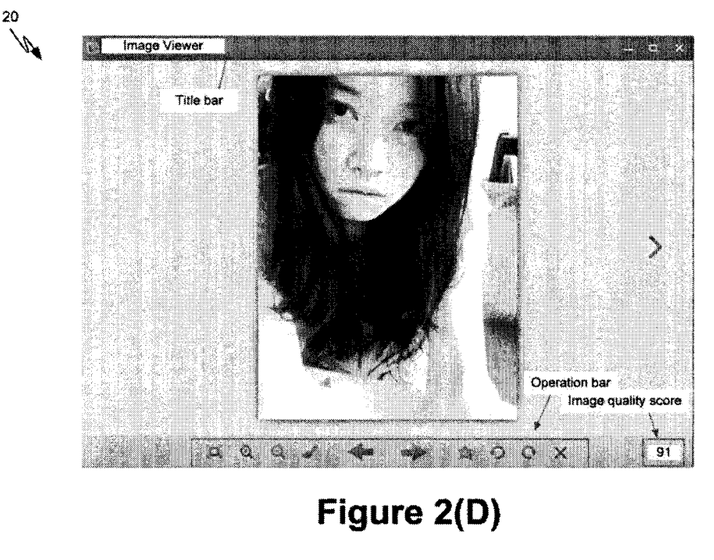
FIG. 2(D) is a simplified diagram showing a display interface according to one embodiment of the present invention.

FIG. 2(D) is a simplified diagram showing a display interface according to one embodiment of the present invention. The diagram is merely an example, which should not unduly limit the scope of the claims. One of ordinary skill in the art would recognize many variations, alternatives, and modifications.

As shown in FIG. 2(D), information associated with a title bar and an operation bar of a window of an image viewer is displayed on the display interface 20 to display the first image and the quality score to the user terminal. For example, the operation bar is configured for operations on the first image, and includes operation buttons arranged in the window of the image viewer. In another example, the quality score of the first image is displayed in an image value display area.

Figure 3:
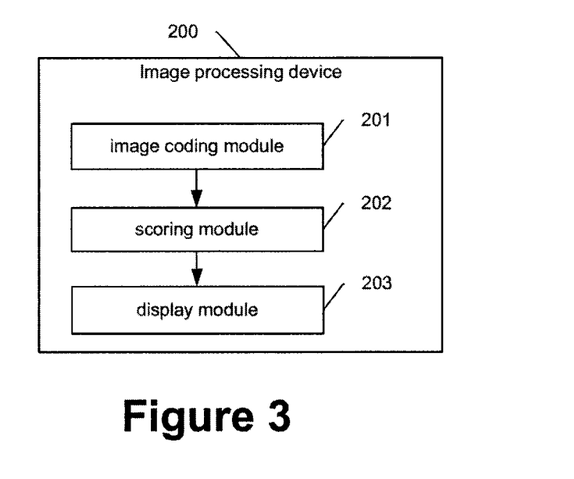
FIG. 3 is a simplified diagram showing a device for image processing according to one embodiment of the present invention.

FIG. 3 is a simplified diagram showing a device for image processing according to one embodiment of the present invention. The diagram is merely an example, which should not unduly limit the scope of the claims. One of ordinary skill in the art would recognize many variations, alternatives, and modifications. The device 200 includes: an image coding module 201, a scoring module 202 and an display module 203. For example, the device 200 includes an image viewer.

According to one embodiment, the image coding module 201 is configured to load a raw image to be viewed and obtain a first image to be displayed by analyzing and encoding the raw image, where the raw image is selected by a user terminal, and the first image is in a predetermined image format. For example, the image coding module 202 is configured to transmit the first image to the scoring module 202 and the display module 203 respectively.

According to another embodiment, the scoring module 202 is configured to acquire one or more preset image display parameters and obtain a quality score of the first image by performing quality analysis and calculation for the first image using the preset image display parameters. For example, the display module 203 is configured to display the first image and the quality score of the first image to the user terminal. For example, the user terminal includes a mobile phone, a tablet computer, a personal computer, etc. In another example, the user terminal includes the device 200 that contains the image viewer which can be a type of application software, such as a QQ image viewer or any other suitable image browsers. In yet another example, a user can operate the image viewer on the user terminal as needed to view and browse an image from an electronic device with a camera function, such as a digital camera, a mobile phone or a camcorder, etc.

According to another embodiment, the user terminal is connected with the electronic device with the camera function via a data line to obtain the image in the electronic device, and stores the obtained image locally where the user terminal is positioned. A user may want to view an image via the image viewer on the user terminal, and determine the quality of multiple images from the electronic device such as a digital camera, a mobile phone and a camera, so as to screen or process these images in other manners, according to certain embodiments. For instance, an image with a poor quality may be deleted or trimmed.

According to yet another embodiment, the information of an image, such as chromaticity, saturation level, blur level and other image display parameters, is analyzed to generate a concrete score so as to provide a uniform standard for image quality determination, so that a user's cognition of image quality is based on data. For example, a raw image selected by the user terminal is loaded via the image coding module 201 which analyzes and encodes the raw image so as to obtain the first image to be displayed. As another example, the first image satisfies one or more display requirements and a predetermined image format (e.g., JPEG, etc.) for further image information processing. The image coding module 201 can analyze and encode the raw image in various manners, according to some embodiments. For example, a code of the raw image is analyzed to obtain a raw image information stream. As an example, the raw image information stream is encoded to generate the first image to be displayed in the predetermined image format (e.g., JPEG, etc.).

In one embodiment, the scoring module 202 performs quality analysis and weighting calculation on the first image based on the plurality of preset image display parameters to obtain the quality score of the first image. For example, the preset image display parameters include edge space distribution, color distribution, image blur level, saturation level, etc. In another example, one or more parameter scores of the first image are generated based on at least information associated with the preset image display parameters.

In another embodiment, the scoring module 202 performs the processes S202-S205 as shown in FIG. 2(A) to generate one or more parameter scores of the first image based on at least information associated with edge space distribution, color distribution, image blur level, and saturation level of the first image, e.g., as shown in. For example, the process S202 includes generating a parameter score for edge space distribution of the first image. In another example, the score for edge space distribution is generated according to a principle that if a main body is simple, then the associated edge space distribution is concentrated. In another example, the more concentrated the edge space distribution is, the higher the score for edge space distribution is.

In yet another embodiment, as shown in FIG. 2(B), an image edge of the first image to be displayed is detected (e.g., the sub-process S302), and an image-edge-concentration area is obtained (e.g., the sub-process S303). For example, the image-edge-concentration area is obtained using a preset matrix (e.g., as shown in FIG. 2(C)) to filter the raw image associated with the first image.

As shown FIG. 2(B), a size ratio between the image-edge-concentration area and the first image is calculated, and the size ratio corresponds to one of the parameter scores, according to certain embodiments. For example, as shown in FIG. 2(B), a transverse ratio between the image-edge-concentration area and the first image is calculated (e.g., the sub-process S306) and a longitudinal ratio between the image-edge-concentration area and the first image is calculated (e.g., the sub-process S307), where the transverse direction corresponds to a X direction and the longitudinal direction corresponds to a Y direction. In another example, the transverse ratio corresponds to a ratio wx (e.g., 90%) determined along the X direction and the longitudinal ratio corresponds to a ratio wy (e.g., 90%) determined along the Y direction. In yet another example, the size ratio is calculated based at least in part on the transverse ratio and the longitudinal ratio (e.g., the sub-process S308). As an example, the size ratio is determined as 1−wx×wy.

According to one embodiment, the scoring module 202 performs the process S203 to generate a parameter score for color distribution of the first image. For example, a linear histogram of image brightness of the first image is obtained. In another example, the linear histogram is compared with a preset standard histogram. In another example, a color distribution difference between the linear histogram and the preset standard histogram is calculated, and the color distribution difference corresponds to one of the parameter scores.

According to another embodiment, the scoring module 202 performs the process S204 to generate a parameter score for image blur level of the first image. For example, a two-dimensional discrete Fourier transformation is performed on the first image that includes a plurality of first pixels. In another example, a pixel ratio between one or more second pixels with a frequency higher than a preset threshold and the first pixels is calculated. The second pixels are among the first pixels, and the pixel ratio corresponds to one of the parameter scores, according to certain embodiments.

According to yet another embodiment, the scoring module 202 performs the process S205 to generate a parameter score for saturation level of the first image. For example, an average saturation value associated with the first image is calculated in a HSV color space, and the average saturation value corresponds to one of the parameter scores. HSV is a color model including three color parameters, namely hue (H), saturation (S) and value (V).

According to yet another embodiment, the scoring module 202 performs the process S206 to perform a linear weighting calculation based on at least information associated with the parameter scores to obtain the quality score. For example, the linear weighting calculation is performed as follows:

$$QS = \frac{ESD \times a + CD \times b + IBL \times c + SL \times d}{a+b+c+d} \quad (2)$$

where QS represents the quality score, ESD represents a parameter score for edge space distribution (e.g., a size ratio), CD represents a parameter score for color distribution (e.g., a color distribution difference), IBL represents a parameter score for image blur level (e.g., a pixel ratio), and SL represents a parameter score for saturation level (e.g., an average saturation value). In addition, a, b, c and d are weights which can be defined based on one or more empirical values, in some embodiments. For example, the weights b and c can be slightly larger than the weights a and d.

Referring back to FIG. 3, after the quality score of the first image is obtained, the display module 203 displays the quality score and the first image to the user terminal together, according to some embodiments. For example, the display module 203 also displays information associated with a title bar and an operation bar of a window of the image viewer on the display interface 20 as shown in FIG. 2(D). As an example, the operation bar is configured for operations on the first image, and includes operation buttons arranged in the window of the image viewer. In another example, the quality score of the first image is displayed in an image value display area.

Figure 4:
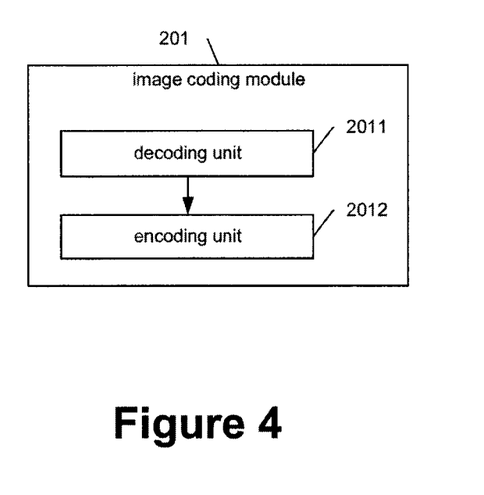
FIG. 4 is a simplified diagram showing an image coding module as part of the device as shown in FIG. 3 according to one embodiment of the present invention.

FIG. 4 is a simplified diagram showing an image coding module as part of the device as shown in FIG. 3 according to one embodiment of the present invention. The diagram is merely an example, which should not unduly limit the scope of the claims. One of ordinary skill in the art would recognize many variations, alternatives, and modifications. The image coding module 201 includes: a decoding unit 2011 and an encoding unit 2012.

According to one embodiment, the decoding unit 2011 is configured to analyze a code associated with the raw image to obtain a raw image information stream. For example, the encoding unit 2012 is configured to encode the raw image information stream to generate the first image of the predetermined image format.

Figure 5:
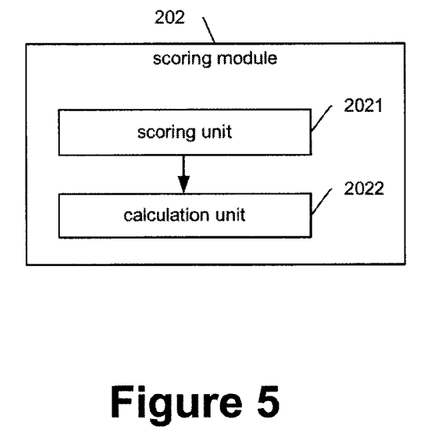
FIG. 5 is a simplified diagram showing a scoring module as part of the device as shown in FIG. 3 according to one embodiment of the present invention.

FIG. 5 is a simplified diagram showing a scoring module as part of the device as shown in FIG. 3 according to one embodiment of the present invention. The diagram is merely an example, which should not unduly limit the scope of the claims. One of ordinary skill in the art would recognize many variations, alternatives, and modifications. The scoring module 202 includes: a scoring unit 2021 and a calculation unit 2022.

According to one embodiment, the scoring unit 2021 is configured to generate one or more parameter scores of the first image based on at least information associated with the preset image display parameters, the parameters including edge space distribution, color distribution, image blur level and saturation level. For example, the calculation unit 2022 is configured to perform a linear weighting calculation based on at least information associated with the parameter scores to obtain the quality score.

According to another embodiment, the scoring unit 2021 is further configured to detect an image edge of the first image, and obtain an image-edge-concentration area. For example, the scoring unit 2021 is further configured to filter a raw image associated with the first image using a preset matrix to obtain the image-edge-concentration area. As an example, the scoring unit 2021 is further configured to calculate a size ratio between the image-edge-concentration area and the first image, the size ratio corresponding to one of the parameter scores. As another example, the scoring unit 2021 is further configured to calculate a transverse ratio and a longitudinal ratio between the image-edge-concentration area and the first image and calculate the size ratio based at least in part on the transverse ratio and the longitudinal ratio.

According to yet another embodiment, the scoring unit 2021 is further configured to obtain a linear histogram of image brightness of the first image, compare the linear histogram with a preset standard histogram, and calculate a color distribution difference between the linear histogram and the preset standard histogram, the color distribution difference corresponding to one of the parameter scores.

In one embodiment, the scoring unit 2021 is further configured to perform two-dimensional discrete Fourier transform on the first image, the first image including a plurality of first pixels, and calculate a pixel ratio between one or more second pixels with a frequency higher than a preset threshold and the first pixels, the second pixels being among the first pixels, the pixel ratio corresponding to one of the parameter scores. For example, the scoring unit 2021 is further configured to calculate an average saturation value associated with the first image in a HSV color space, the average saturation value corresponding to one of the parameter scores.

According to some embodiments, an image processing terminal includes the device 200 that contains the image viewer. For example, the image processing terminal is configured to load a raw image to be viewed, the raw image being selected by a user terminal, obtain a first image to be displayed by analyzing and encoding the raw image, the first image being of a predetermined image format, acquire one or more preset image display parameters, obtain a quality score of the first image by performing quality analysis and calculation for the first image using the preset image display parameters, and displaying the first image and the quality score of the first image to the user terminal.

According to one embodiment, a method is provided for image processing. For example, a raw image is loaded to be viewed, the raw image being selected by a user terminal; a first image to be displayed is obtained by analyzing and encoding the raw image, the first image being of a predetermined image format; one or more preset image display parameters are acquired; a quality score of the first image is obtained by performing quality analysis and calculation for the first image using the preset image display parameters; and the first image and the quality score of the first image are displayed to the user terminal. For example, the method is implemented according to at least FIG. 1.

According to another embodiment, a device for image processing includes: an image coding module configured to load a raw image to be viewed and obtain a first image to be displayed by analyzing and encoding the raw image, the raw image being selected by a user terminal, the first image being of a predetermined image format, a scoring module configured to acquire one or more preset image display parameters and obtain a quality score of the first image by performing quality analysis and calculation for the first image using the preset image display parameters, and a display module configured to display the first image and the quality score of the first image to the user terminal. For example, the device is implemented according to at least FIG. 3.

According to yet another embodiment, a terminal for image processing includes: a device that contains: an image coding module configured to load a raw image to be viewed and obtain a first image to be displayed by analyzing and encoding the raw image, the raw image being selected by a user terminal, the first image being of a predetermined image format, a scoring module configured to acquire one or more preset image display parameters and obtain a quality score of the first image by performing quality analysis and calculation for the first image using the preset image display parameters, and a display module configured to display the first image and the quality score of the first image to the user terminal. For example, the terminal is implemented according to at least FIG. 3.

According to yet another embodiment, a non-transitory computer readable storage medium includes programming instructions for image processing. The programming instructions are configured to cause one or more data processors to execute certain operations. For example, a raw image is loaded to be viewed, the raw image being selected by a user terminal; a first image to be displayed is obtained by analyzing and encoding the raw image, the first image being of a predetermined image format; one or more preset image display parameters are acquired; a quality score of the first image is obtained by performing quality analysis and calculation for the first image using the preset image display parameters; and the first image and the quality score of the first image are displayed to the user terminal. For example, the storage medium is implemented according to at least FIG. 1.

The above only describes several scenarios presented by this invention, and the description is relatively specific and detailed, yet it cannot therefore be understood as limiting the scope of this invention. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it is understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. A method for image processing comprising:
   loading a raw image to be viewed, the raw image being selected by a user terminal;
   obtaining a first image to be displayed by analyzing and encoding the raw image, the first image being of a predetermined image format;
   acquiring one or more preset image display parameters;
   obtaining a quality score of the first image by performing quality analysis and calculation for the first image using the preset image display parameters; and
   displaying the first image and the quality score of the first image to the user terminal;
   wherein the obtaining a quality score of the first image by performing quality analysis and calculation for the first image using the preset image display parameters includes:
      generating one or more parameter scores of the first image based on at least information associated with the preset image display parameters, the preset image display parameters including edge space distribution, color distribution, image blur level and saturation level; and
      performing a linear weighting calculation based on at least information associated with the parameter scores to obtain the quality score;
   wherein the generating one or more parameter scores of the first image based on at least information associated with the preset image display parameters includes:
      detecting an image edge of the first image;
      obtaining an image-edge-concentration area in the first image; and
      calculating a size ratio between the image-edge-concentration area and the first image, the size ratio corresponding to one of the parameter scores.

2. The method of claim 1, wherein the obtaining a first image to be displayed by analyzing and encoding the raw image includes:
   analyzing a code associated with the raw image to obtain a raw image information stream; and
   encoding the raw image information stream to generate the first image of the predetermined image format.

3. The method of claim 1, wherein the detecting an image edge of the first image includes:
   filtering a raw image associated with the first image using a preset matrix to obtain the image-edge-concentration area.

4. The method of claim 1, wherein the calculating a size ratio between the image-edge-concentration area and the first image, the size ratio corresponding to one of the parameter scores includes:
   calculating a transverse ratio and a longitudinal ratio between the image-edge-concentration area and the first image; and
   calculating the size ratio based at least in part on the transverse ratio and the longitudinal ratio.

5. The method of claim 1, wherein the generating one or more parameter scores of the first image based on at least information associated with the preset image display parameters includes:
   calculating an average saturation value associated with the first image in a HSV color space, the average saturation value corresponding to one of the parameter scores.

6. The method of claim 1, further comprising:
   displaying information associated with a title bar and an operation bar of a viewer window on a display interface to display the first image and the quality score to the user terminal.

7. A method for image processing comprising:
   loading a raw image to be viewed, the raw image being selected by a user terminal;
   obtaining a first image to be displayed by analyzing and encoding the raw image, the first image being of a predetermined image format;
   acquiring one or more preset image display parameters;
   obtaining a quality score of the first image by performing quality analysis and calculation for the first image using the preset image display parameters; and
   displaying the first image and the quality score of the first image to the user terminal;
   wherein the obtaining a quality score of the first image by performing quality analysis and calculation for the first image using the preset image display parameters includes:
      generating one or more parameter scores of the first image based on at least information associated with the preset image display parameters, the preset image display parameters including edge space distribution, color distribution, image blur level and saturation level; and
      performing a linear weighting calculation based on at least information associated with the parameter scores to obtain the quality score;

wherein the generating one or more parameter scores of the first image based on at least information associated with the preset image display parameters includes:
obtaining a linear histogram of image brightness of the first image;
comparing the linear histogram with a preset standard histogram; and
calculating a color distribution difference between the linear histogram and the preset standard histogram, the color distribution difference corresponding to one of the parameter scores.

8. A method for image processing comprising:
loading a raw image to be viewed, the raw image being selected by a user terminal;
obtaining a first image to be displayed by analyzing and encoding the raw image, the first image being of a predetermined image format;
acquiring one or more preset image display parameters;
obtaining a quality score of the first image by performing quality analysis and calculation for the first image using the preset image display parameters; and
displaying the first image and the quality score of the first image to the user terminal;
wherein the obtaining a quality score of the first image by performing quality analysis and calculation for the first image using the preset image display parameters includes:
generating one or more parameter scores of the first image based on at least information associated with the preset image display parameters, the preset image display parameters including edge space distribution, color distribution, image blur level and saturation level; and
performing a linear weighting calculation based on at least information associated with the parameter scores to obtain the quality score;
wherein the generating one or more parameter scores of the first image based on at least information associated with the preset image display parameters includes:
performing a two-dimensional discrete Fourier transformation on the first image, the first image including a plurality of first pixels; and
calculating a pixel ratio between one or more second pixels with a frequency higher than a preset threshold and the first pixels, the second pixels being among the first pixels, the pixel ratio corresponding to one of the parameter scores.

9. A device for image processing comprising:
an image coding module configured to load a raw image to be viewed and obtain a first image to be displayed by analyzing and encoding the raw image, the raw image being selected by a user terminal, the first image being of a predetermined image format;
a scoring module configured to acquire one or more preset image display parameters and obtain a quality score of the first image by performing quality analysis and calculation for the first image using the preset image display parameters; and
a display module configured to display the first image and the quality score of the first image to the user terminal;
wherein the scoring module includes:
a scoring unit configured to generate one or more parameter scores of the first image based on at least information associated with the preset image display parameters, the parameters including edge space distribution, color distribution, image blur level and saturation level; and
a calculation unit configured to perform a linear weighting calculation based on at least information associated with the parameter scores to obtain the quality score;
wherein the scoring unit is further configured to detect an image edge of the first image, obtain an image-edge-concentration area, and calculate a size ratio between the image-edge-concentration area and the first image, the size ratio corresponding to one of the parameter scores.

10. The device of claim 9, wherein the image coding module includes:
a decoding unit configured to analyze a code associated with the raw image to obtain a raw image information stream; and
an encoding unit configured to encode the raw image information stream to generate the first image of the predetermined image format.

11. The device of claim 9, wherein the scoring unit is further configured to calculate an average saturation value associated with the first image in a HSV color space, the average saturation value corresponding to one of the parameter scores.

12. The device of claim 9, wherein the display module is further configured to display information associated with a title bar and an operation bar of a viewer window on a display interface to display the first image and the parameter scores to the user terminal.

13. The device of claim 9, further comprising:
one or more data processors; and
a computer-readable storage medium;
wherein one or more of the image coding module, the scoring module, and the display module are stored in the storage medium and configured to be executed by the one or more data processors.

14. A device for image processing comprising:
an image coding module configured to load a raw image to be viewed and obtain a first image to be displayed by analyzing and encoding the raw image, the raw image being selected by a user terminal, the first image being of a predetermined image format;
a scoring module configured to acquire one or more preset image display parameters and obtain a quality score of the first image by performing quality analysis and calculation for the first image using the preset image display parameters; and
a display module configured to display the first image and the quality score of the first image to the user terminal;
wherein the scoring module includes:
a scoring unit configured to generate one or more parameter scores of the first image based on at least information associated with the preset image display parameters the parameters including edge space distribution, color distribution, image blur level and saturation level; and
a calculation unit configured to perform a linear weighting calculation based on at least information associated with the parameter scores to obtain the quality score;
wherein the scoring unit is further configured to obtain a linear histogram of image brightness of the first image, compare the linear histogram with a preset standard histogram, and calculate a color distribution difference between the linear histogram and the preset standard histogram, the color distribution difference corresponding to one of the parameter scores.

15. A device for image processing comprising:
an image coding module configured to load a raw image to be viewed and obtain a first image to be displayed by analyzing and encoding the raw image, the raw image being selected by a user terminal, the first image being of a predetermined image format;

a scoring module configured to acquire one or more preset image display parameters and obtain a quality score of the first image by performing quality analysis and calculation for the first image using the preset image display parameters; and a display module configured to display the first image and the quality score of the first image to the user terminal;

wherein the scoring module includes:
- a scoring unit configured to generate one or more parameter scores of the first image based on at least information associated with the preset image display parameters, the parameters including edge space distribution, color distribution, image blur level and saturation level; and
- a calculation unit configured to perform a linear weighting calculation based on at least information associated with the parameter scores to obtain the quality score;

wherein the scoring unit is further configured to perform two-dimensional discrete Fourier transform on the first image, the first image including a plurality of first pixels, and calculate a pixel ratio between one or more second pixels with a frequency higher than a preset threshold and the first pixels, the second pixels being among the first pixels, the pixel ratio corresponding to one of the parameter scores.

* * * * *